United States Patent [19]

Aulehla et al.

[11] Patent Number: 4,836,473

[45] Date of Patent: Jun. 6, 1989

[54] APPARATUS FOR INFLUENCING A BOUNDARY LAYER ON THE SURFACE OF A BODY MOVING THROUGH A MEDIUM

[75] Inventors: Felix Aulehla, Ottobrunn; Hans-Peter Genssler, Munich, both of Fed. Rep. of Germany

[73] Assignee: Messerschmitt-Boelkow-Blohm GmbH, Munich, Fed. Rep. of Germany

[21] Appl. No.: 58,511

[22] Filed: Jun. 5, 1987

Related U.S. Application Data

[63] Continuation-in-part of Ser. No. 864,593, May 16, 1986, abandoned.

[30] Foreign Application Priority Data

Jun. 14, 1985 [DE] Fed. Rep. of Germany ....... 3521329

[51] Int. Cl.⁴ .............................................. B64C 23/06
[52] U.S. Cl. .................................. 244/130; 244/53 B; 244/199
[58] Field of Search ............... 244/207, 208, 209, 199, 244/198, 53 B, 130

[56] References Cited

U.S. PATENT DOCUMENTS

| | | |
|---|---|---|
| 2,509,890 | 5/1950 | Stalker ................................ 244/209 |
| 2,650,752 | 9/1953 | Haidley ............................... 244/209 |
| 2,694,357 | 11/1954 | Lee . |
| 2,699,906 | 1/1955 | Lee et al. ........................... 244/53 B |
| 3,062,484 | 11/1962 | Hiniky ............................... 244/53 B |
| 3,578,264 | 5/1971 | Kuethe . |
| 4,121,606 | 10/1978 | Holland et al. .................... 244/53 B |
| 4,174,083 | 11/1979 | Mohn . |
| 4,377,982 | 3/1983 | Gungover ........................... 244/199 |

FOREIGN PATENT DOCUMENTS 595877  4/1960  Canada ................................ 244/199

Primary Examiner—Galen Barefoot
Attorney, Agent, or Firm—W. G. Fasse; D. H. Kane, Jr.

[57] ABSTRACT

The pressure drag on the skin of an aircraft is reduced by rigidly securing boundary layer influencing members to the skin of the aircraft, including the wings, the elevantor and fin/rudder assemblies, and the body near the tail end. These members may be vortex generators and boundary layer diverters and are always located in the attached flow. In addition, if the members are placed upstream of any air intakes, especially flush air intakes, the air intake efficiency is also improved. The influencing members have an effective height above the surface corresponding, at the most, to the displacement thickness portion of the boundary layer.

13 Claims, 6 Drawing Sheets

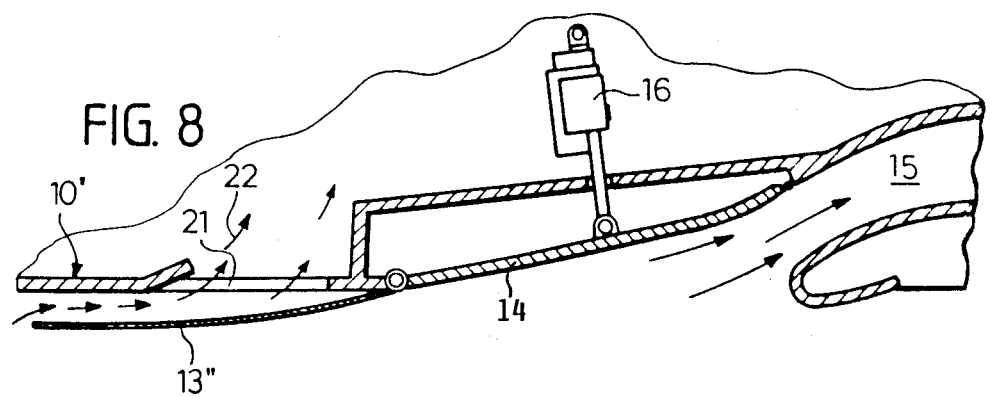
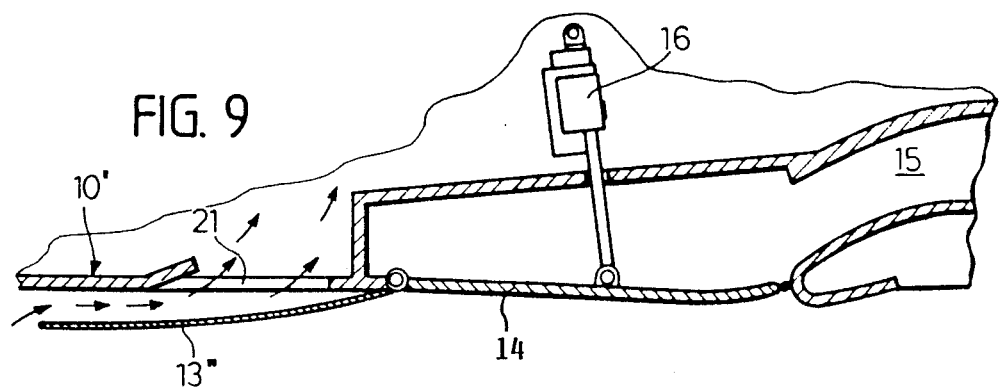

APPARATUS FOR INFLUENCING A BOUNDARY LAYER ON THE SURFACE OF A BODY MOVING THROUGH A MEDIUM

CROSS-REFERENCE TO RELATED APPLICATION

The present application is a continuation-in-part application of our copending application U.S. Ser. No. 864,593; filed on May 16, 1986, now abandoned.

FIELD OF THE INVENTION

The invention relates to an apparatus for influencing a boundary layer on the surface of a body moving through a medium, such as an aircraft, a motor vehicle, or the like. The apparatus reduces the pressure drag with the aid of vortex generators or boundary layer diverters. Where air intakes are involved, the air intake efficiency is increased.

DESCRIPTION OF THE PRIOR ART

It is known to use vortex generators for avoiding the flow separation from a body. Thus, such vortex generators have been arranged at the nose portion of an aircraft fuselage. It is known, for example, from U.S. Pat. No. 4,174,083 to arrange vortex generators in the movable air inlet of an aircraft. Efforts to reduce the drag at the rear portions of bodies in attached flow are not disclaimed closed in U.S. Pat. No. 4,174,083.

U.S. Pat. No. 2,694,357 discloses air intakes capable of scooping air into the aircraft with a lower added drag than is possible by scoops or Pitot air intakes. The air intakes according to U.S. Pat. No. 2,694,357 are located in the nose portion of the fuselage, that is, in zones of thin fuselage boundary layers. The vortex generators or delta type vortex generators are supposed to prevent a flow separation in the air inlet duct. The features of U.S. Pat. No. 2,694,357 are also intended to achieve an improvement in the pressure recovery. However, there are no suggestions or hints toward an improvement of the internal air intake quality (pressure distortion, flow angularity). There are also no suggestions with regard to improving, or rather reducing the drag at the rear portion of bodies in attached flow.

The U.S. Pat. No. 3,578,264 (Kuethe) teaches a boundary layer control by means of vortex generating regions having an effective depth of less than the boundary layer thickness where these regions are located. The main purpose of these regions is to prevent boundary layer separation. For achieving this purpose the regions must be positioned on the surface just upstream of locations where boundary layer separation is incipient.

While U.S. Pat. No. 3,578,264 (Kuethe) achieves some drag reduction, Kuethe does not recognize that a further effective drag reduction can be achieved by specifically addressing the pressure drag component which is primarily effective in the zone of the displacement thickness of the boundary layer. Hence, Kuethe does not make any suggestions in this respect.

OBJECTS OF THE INVENTION

In view of the foregoing it is the aim of the invention to achieve the following objects singly or in combination:

to provide an apparatus of the type mentioned above which reduces specifically the pressure drag component of bodies in attached unseparated flow moving through a to improve the air intake pressure recovery and quality in an air intake, especially a flush air intake of a body moving through a medium;

to improve the fuel consumption, especially of aircraft on long-distance flights;

to improve the power output of auxiliary power plants in an aircraft or the like while simultaneously improving the restartability of such auxiliary power plants at high altitudes; and to secure vortex generators or diverters to the surface of a body in contact with an attached flow downstream of the greatest thickness of the respective body, said vortex generators or diverters having, above said surface, a height which is smaller than or equal to the displacement thickness of a boundary layer on said surface for reducing the pressure drag component.

SUMMARY OF THE INVENTION

According to the invention vortex generators, such as delta wing type vortex generators, or boundary layer diverters are arranged as boundary layer influencing members on various surfaces of the aircraft. Thus, these boundary layer influencing members are located approximately along the entire wing span downstream of the largest wing thickness. The term "downstream" in this context has reference to the air flow direction. Such influencing members are also located on the fin and elevator surfaces downstream of the largest thickness thereof and on the surfaces of the rudder assembly, also downstream of the largest thickness of the rudder assembly. Additionally, the boundary layer influencing members are located around approximately the entire fuselage circumference at the tail end of the aircraft. All influencing members are rigidly arranged. Where air intakes are provided, the influencing members are located upstream of the flush air intakes. All these influencing members must be located in the attached or unseparated flow of the boundary layer and they must be shorter than the displacement thickness $\delta^*$ of the boundary layer in order to effectively reduce the pressure drag component of the drag.

The features applied according to the invention have resulted in a fuel saving of about 2% on long distance flights compared to the same aircraft not equipped as taught herein. Further advantages reside in the improved efficiency of the power output of auxiliary power plants in such aircraft and in the easier ability to restart such auxiliary power plants at high altitudes. The flight safety is also improved because any fuel that might leak out of an aircraft is deflected, and hence prevented from entering an air inlet.

BRIEF DESCRIPTION OF THE DRAWINGS

In order that the invention may be clearly understood, it will now be described, by way of example, with reference to the accompanying drawings, wherein:

FIG. 8 is a sectional view through a gas turbine air intake with a rigidly arranged boundary layer diverter, whereby the air intake is shown in its open state, whereby the deflected air is sucked into the aircraft for cooling or for ventilation;

FIG. 9 is a view similar to that of FIG. 8, but showing the air intake in its closed state;

Figure 1:
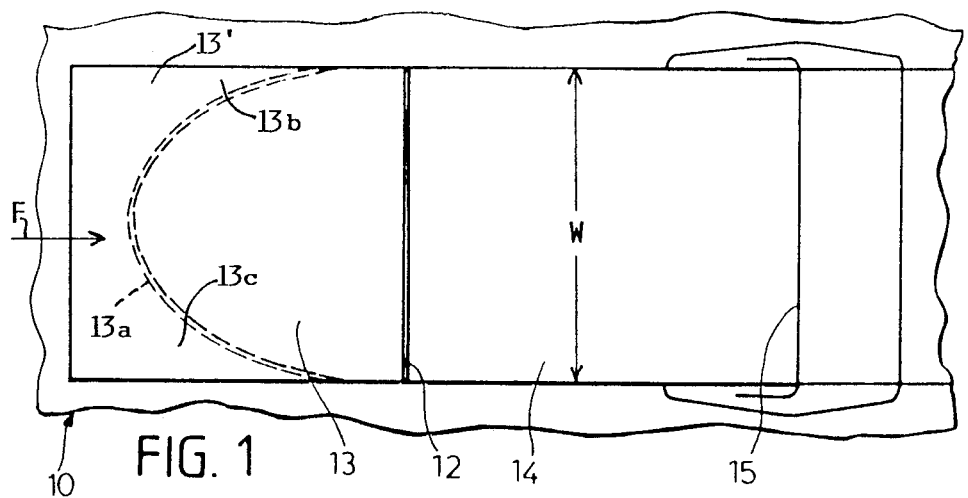
FIG. 1 is a bottom view of a flap controlled gas turbine air intake provided with a rigid boundary layer influencing member in the form of a boundary layer diverter upstream of the air intake opening.

DETAILED DESCRIPTION OF PREFERRED EXAMPLE EMBODIMENTS AND OF THE BEST MODE OF THE INVENTION

As stated above it is known to improve the pressure recovery with the aid of vortex generators or delta wings. Such pressure recovery makes the power reduction occurring at high altitudes less severe.

Further, the starting of auxiliary equipment at these high altitudes, is made easier by the improved pressure recovery due to the deflection of the adverse boundary layer. However, tests made by the applicants have shown that further, substantially larger improvements can be made not only in the pressure recover, but also in the pressure nonuniformity and in the drag when the flow is still attached to the surface at the respective surface location. Thus, the invention proposes to rigidly arrange vortex generators 11, delta wing vortex generators 11a, and boundary layer diverters 13 extending approximately over the entire wingspread downstream of the largest wing thickness and also downstream of the largest thickness of the elevator and fin assembly and downstream of the largest thickness of the rudder assembly and approximately all around a circumference in the tail end of the aircraft 10. Where flush air intakes are located, the just enumerated boundary layer influencing members are located upstream of such flush air inlets 15, 21. By arranging the flush air inlet 15 downstream of the rigid boundary layer deflector 13 as viewed in the flow direction F in FIG. 1, the invention achieves an overall reduction in the pressure drag and simultaneously an improvement in the air intake efficiency. Stated differently, the air intake pressure recovery, the air intake flow uniformity, and the installation pressure ratio are all improved. This improvement is assured, even though a local or parasitic drag may be increased, because the afterbody drag improvement more than compensates for any parasitic drag that may occur.

Figure 2:
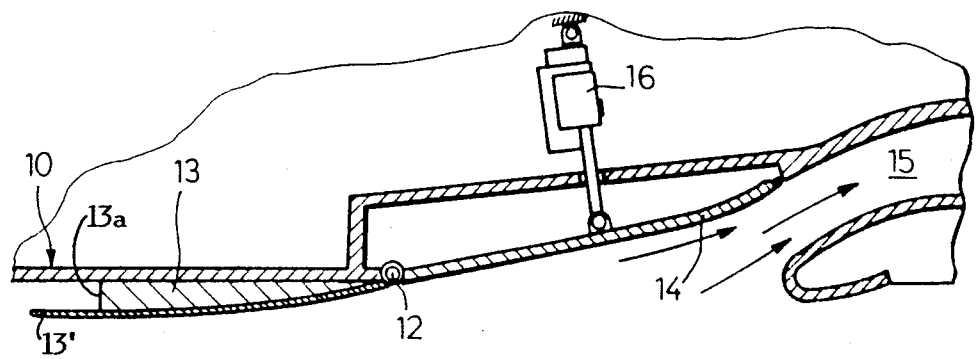
FIG. 2 is a sectional view through the air inlet and boundary layer diverter of FIG. 1, whereby the air intake is in its open state.
Figure 3:
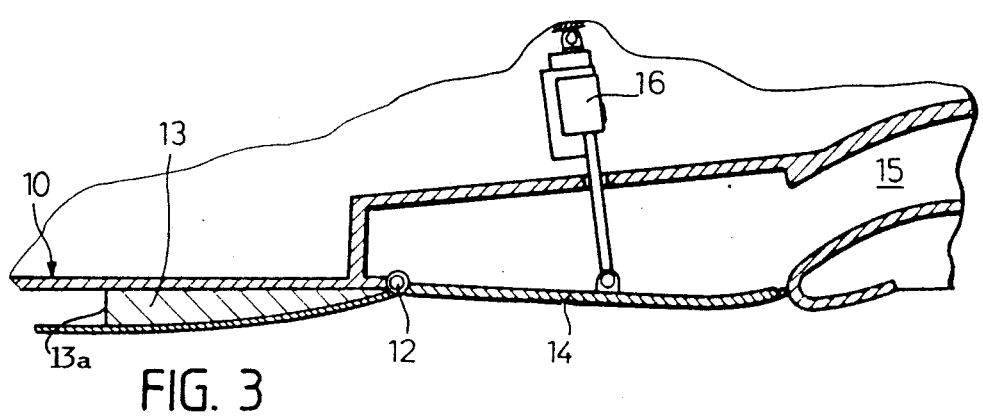
FIG. 3 is a sectional view similar to that of FIG. 2, but showing the air intake in its closed state.

In FIGS. 1, 2, and 3, the boundary layer deflector 13 is a diverter member having a curved leading edge 13a. The diverter member 13 has a cover 13' slightly spaced from the surface or skin 10 of the aircraft. The member 13 has a width near the hinge 12 corresponding to the given width W of the flush air intake 15. The cover 13' has a width, throughout its length, corresponding to the given width W, whereby the boundary layer diverter flow channels 13b and 13c are formed. The deflector member 13 with its cover 13' is arranged upstream of the hinge 12 which a flap 14 to the aircraft body or fuselage for opening and closing the flush air intake 15 with the aid of a conventional actuator 16.

Figure 4:
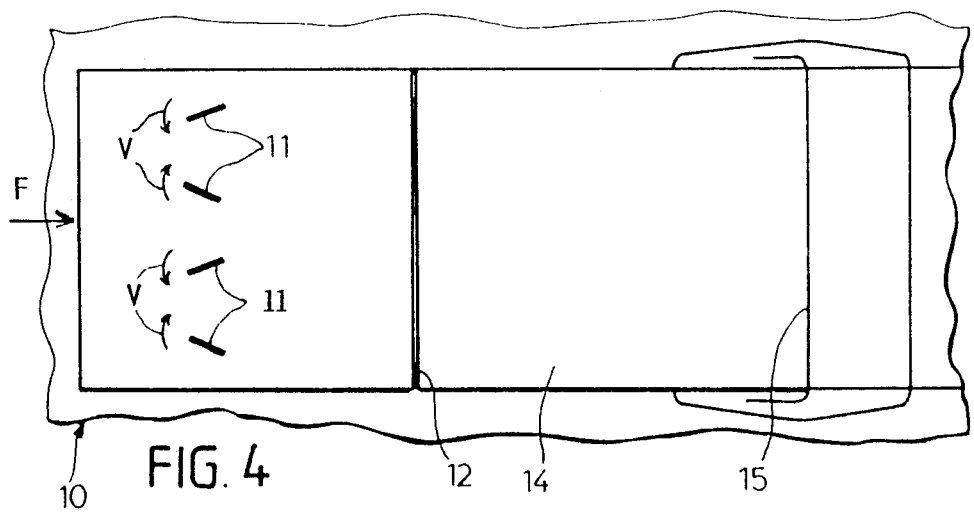
FIG. 4 is a bottom view similar to that of FIG. 1, but showing vortex generators operating as boundary layer influencing members arranged in pairs in a "counter-rotating" manner.
Figure 5:
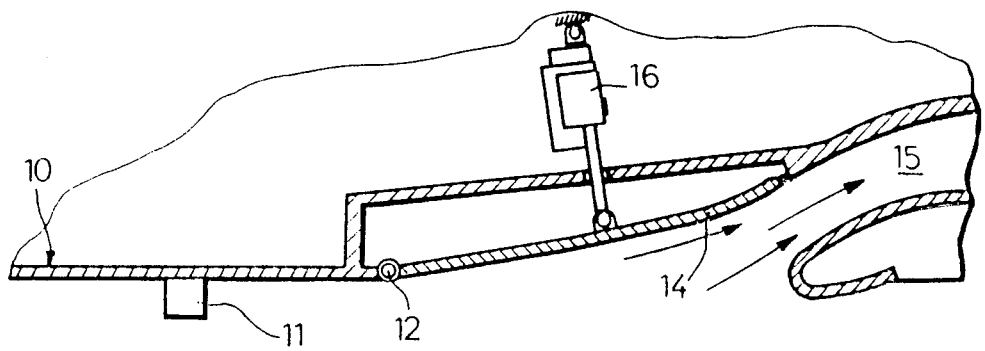
FIG. 5 is a sectional view through FIG. 4, with the air intake in its open state.
Figure 6:
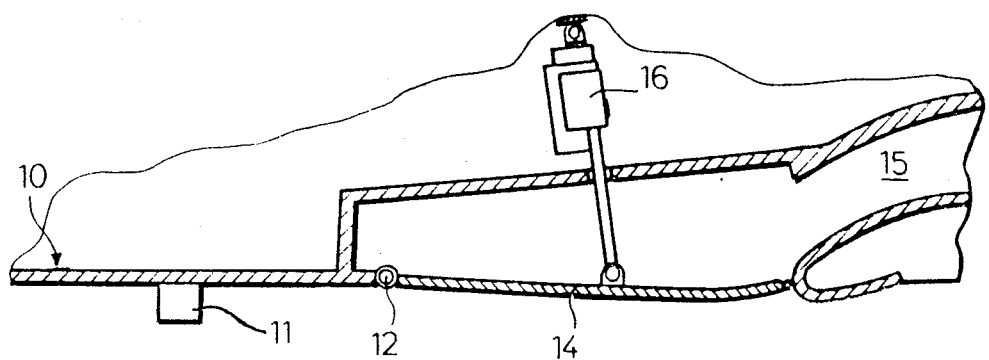
FIG. 6 is a sectional view similar to FIG. 5, with the air intake in its closed state.

In FIGS. 4, 5, and 6 the boundary layer deflector has been replaced by a plurality of vortex generators 11 rigidly secured to the aircraft body or frame 10 upstream of the flush air intake or inlet 15. The vortex generators 11 are so arranged that the rotational directions of the vortices V of a pair of vortex generators 11 oppose each other.

Figure 7A:
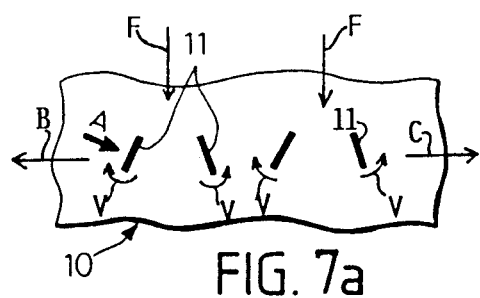
FIG. 7a is a plan view of two pairs of vortex generators which are so arranged that opposing rotational vortex flow directions are generated.

FIG. 7a shows a broken away portion of the aircraft skin at its tail end, whereby the arrows B and C point in opposite circumferential directions. Only a few vortex generators 11 are shown and they are arranged in pairs so that again the rotational directions of the vortices V oppose each other as in FIG. 4. It will be appreciated, that these pairs of vortex generators 11 are arranged approximately all around the body perimeter, only a portion of which is shown in FIG. 7a.

Figure 7D:
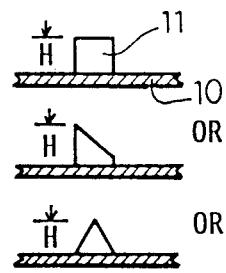
FIG. 7d illustrates several side views of different vortex generator configurations as viewed in the direction A in FIGS. 7a and 7b; is a side view of a wing type vortex generator as also shown in FIG. 7c, whereby this vortex generator may have a delta configuration or a sweepback wing configuration.
Figure 7B:
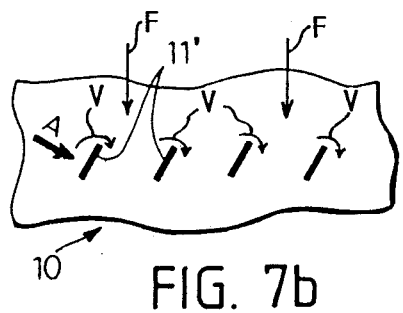
FIG. 7b shows an arrangement of vortex generators all of which cause the same vortex flow direction upstream of an air intake.

In FIG. 7b the vortex generators 11' are so arranged that the rotational directions of the vortices V all extend in the same direction.

Figure 7C:
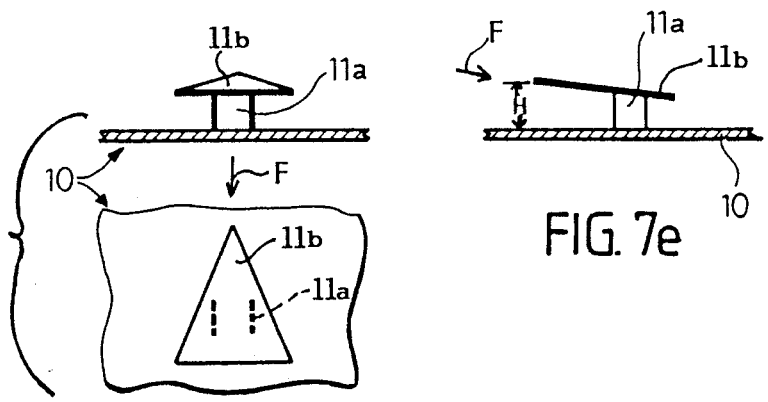
FIG. 7c shows a top plan and rear view of a wing type vortex generator.
Figure 7E:
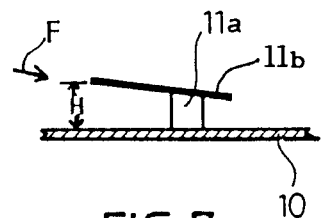

FIG. 7c shows in its upper portion a rear view of a delta winged vortex generator 11b mounted to the aircraft surface 10 on rigid legs 11a. The lower portion of FIG. 7c shows a top plan view of the delta winged vortex generator 11b. FIG. 7e shows a side view of the vortex generator 11b. The shape of the vortex generator shown in FIGS. 7c and 7e is not limited to the shown example. Other configurations are quite possible instead of the triangular configuration shown. For example, the vortex generator may have a square or a rectangular plan view configuration or it may have the shape of an arrow. The angle of attack may also vary in accordance with particular circumstances. Similarly, the sweepback angle may be larger or smaller, depending on the particular requirements. The just mentioned angle of attack is shown in FIG. 7e where the leading edge of the vortex generator plate 11b is located at a higher level than the trailing edge.

FIG. 7d shows several side views in the direction of the arrow A in FIGS. 7a and 7b. Again, the invention is not limited to the side view configurations shown in FIG. 7d. For example, a zig-zag configuration is also possible.

FIGS. 8 and 9 show another embodiment using a boundary layer diverter 13" arranged upstream of the flush air inlet 15, which is open in FIG. 8 with the flap 14 drawn into the fuselage and which is closed in FIG. 9 with the flap 14 extended. A further air inlet or opening 21 is provided in the aircraft skin 10' so that the boundary layer diverter 13″ can scoop air 22 through the inlet 21 for general use inside the aircraft. The boundary layer diverter 13″ further protects the air inlet 15 for the auxiliary power plant or heat exchanger against any contaminating matter that might pass along the outside aircraft skin such as liquids, including rain water, skydrol, kitchen waste from the aircraft kitchen, and fuel. As a result, it is possible to clean the air inlet of the auxiliary power plant and the auxiliary power plant itself less frequently. Additionally, the diverter 13″ has the advantage that it reduces any danger of explosion because it prevents any leaking fuel to enter into the auxiliary power plant. These are all distinct advantages of the invention.

Figure 10:
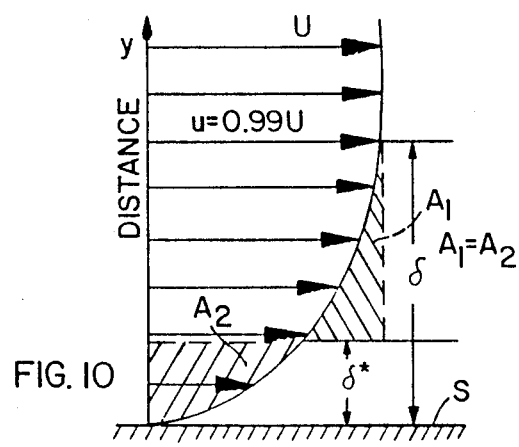
FIG. 10 is a view of a boundary layer profile for explaining the effective height or depth of the boundary layer influencing members of the invention for obtaining an effective pressure drag reduction; and is a schematic top view of an aircraft to surface zones of which the present boundary layer influencing members may be attached.

Referring to FIG. 10, the boundary layer has a thickness δ above the surface S. The thickness δ is conventionally determined by the expression u=0.99 U which means that the boundary layer thickness ends where the local flow speed u is 99 percent of the local free stream velocity U of the fluid relative to the body having the surface S. The displacement thickness δ* is smaller than the boundary layer thickness δ and is determined. The equation $$\delta^* = \int_0^\delta \left(1 - \frac{u}{U}\right) dy,$$

wherein u is again the velocity at the distance y away from the surface and U is the external inviscid velocity. The displacement thickness δ also defines two surfaces A1 and A2 as shown in FIG. 10. According to the invention these surfaces A1, A2 should be about equal to each other.

The invention teaches that for an effective pressure drag reduction the effective height H, please see FIGS. 7e and 7d, of the boundary layer influencing members must be not more than δ* or not more than about 0.4 δ: Tests have shown that these features resulted in a fuel savings of about 2% on long-distance flights as disclosed above.

Figure 11:
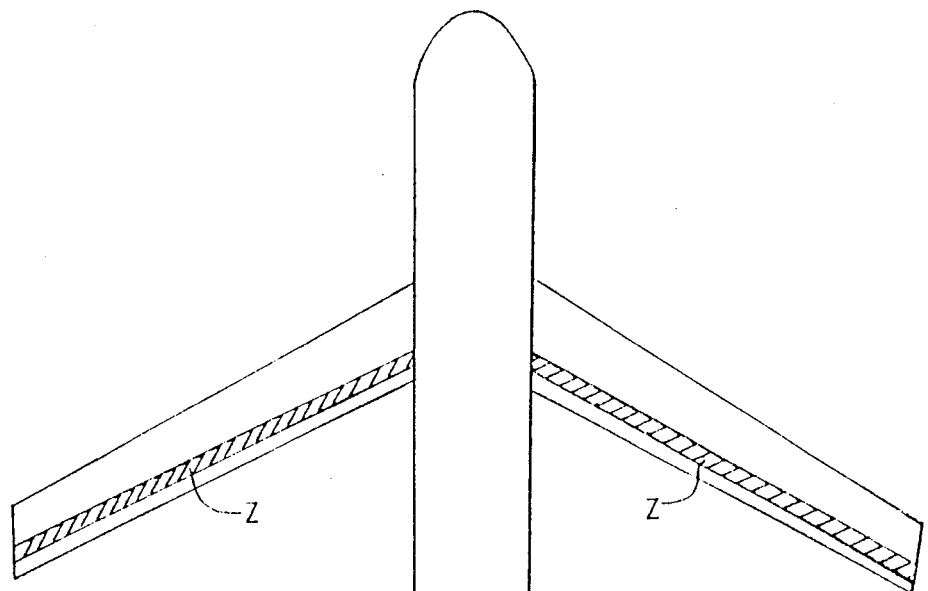

FIG. 11 is a schematic view of an aircraft having surface zones Z to which the present boundary layer influencing members or vortex generators are attached.

Although the invention has been described with reference specific example embodiments, it will be appreciated that it is intended to cover all modifications and equivalents within the scope of the appended claims.

What is claimed is:

1. An apparatus for influencing a boundary layer o nan aircraft surface including wing surfaces, elevator surfaces, fin/rudder surfaces, and body surfaces, comprising boundary layer influencing means rigidly secured to said wing surfaces approximately along the entire wing span in a fully attached boundary layer flow downstream of the largest wing thickness as viewed in the air flow direction but upstream of any boundary layer separation point, said boundary layer influencing means being also secured to said elevator surfaces in a fully attached boundary layer flow downstream of the largest elevator thickness but upstream of any boundary layer separation point, to said fin/rudder surfaces in a fully attached boundary layer flow downstream of the largest fin/rudder thickness but upstream of any boundary layer separation point, and to said body surfaces in a fully attached boundary layer flow approximately around an entire body circumference of the aircraft tail end but upstream of any boundary layer separation point, said boundary layer influencing means having an effective height shorter than a respective displacement thickness of the corresponding fully attached boundary layer on the respective surface whereby the pressure drag component of the total drag effective on the aircraft is reduced.

2. The apparatus of claim 1, wherein said boundary layer influencing means comprise vortex generators rigidly connected to said surfaces.

3. The apparatus of claim 2, wherein said vortex generators are delta wing vortex generators rigidly connected to said surfaces.

4. The apparatus of claim 1, wherein said boundary layer influencing means are boundary layer diverters rigidly connected to said surfaces.

5. The apparatus of claim 1, further comprising flush air inlet means for supplying air into the aircraft, said boundary layer influencing means being arranged upstream of said flush air inlet means for improving the inflow efficiency of said flush air inlet means.

6. The apparatus of claim 5, wherein said boundary layer influencing means are vortex generators arranged upstream of said flush air inlet means, said vortex generators being directed for generating vortices having rotational directions opposing each other.

7. The apparatus of claim 5, wherein said boundary layer influencing means are vortex generators arranged upstream of said flush air inlet means, said vortex generators being directed for generating vortices having rotational directions extending all in the same direction.

8. An aircraft comprising a system for reducing the pressure drag component of the total drag of said aircraft by influencing a boundary layer on a surface of said aircraft including wing surfaces, elevator surfaces, fin/rudder surfaces, and body surfaces, said system comprising boundary layer influencing means rigidly secured to said wing surfaces approximately along the entire wing span in a fully attached boundary layer flow downstream of the largest wing thickness as viewed in the air flow direction, said boundary layer influencing means being also secured to said elevator surfaces in a fully attached boundary layer flow downstream of the largest elevator thickness, to said fin/rudder surfaces in a fully attached boundary layer flow downstream of the largest fin/rudder thickness, and to said body surfaces in a fully attached boundary layer flow approximately around an entire body circumference of the aircraft tail end, said boundary layer influencing means having an effective height shorter than a respective displacement thickness of the corresponding fully attached boundary layer on the respective surface for reducing the pressure drag component of the total drag effective on the aircraft, said aircraft further comprising flush air inlet means having a given width (W) for supplying air into the aircraft, a hinged flap (14) for opening and closing said flush air inlet means, and a boundary layer diverter (13, 13″) arranged directly upstream of a hinged end of said flap (14) of said flush air inlet means, said boundary layer diverter (13, 13″) having a diverter width corresponding at least to said given width (W) of said flush air inlet means for diverting the boundary layer substantially completely away from said flush air inlet means for further reducing said total pressure drag and improving air intake efficiency.

9. The aircraft of claim 8, wherein said boundary layer diverter (13) has a member with a curved leading edge (13a) merging into said diverter width, and a cover (13') projecting forward of said curved leading edge, said cover (13') also having a width corresponding to said given width (W) of said flush air inlet means (15). said diverter member spacing said cover (13') from the respective aircraft body surface (10) for forming boundary layer diverter flow channels (13b and 13c) leading away from said flush air intake.

10. The aircraft of claim 8, wherein said aircraft body surface (10') has an opening (21) just upstream of said hinged end (12) of said flap (14), said boundary layer diverter (13") forming a cover which is slightly spaced from said aircraft body surface above said opening (21) to form an air intake scoop which feeds the boundary layer into the aircraft body away from said flush air inlet means.

11. A flush air inlet construction for an aircraft having a body with a skin, comprising flush air inlet means (15) having a given width (W) for supplying air into the aircraft, a hinged flap (14) for opening and closing said flush air inlet means, and a boundary layer diverter (13, 13") arranged directly upstream of a hinged end of said flap (14) of said flush air inlet means, said boundary layer diverter (13, 13") having a diverter width corresponding at least to said given width (W) of said flush air inlet means for diverting the boundary layer substantially completely away from said flush air inlet means for effectively reducing total pressure drag and for improving air intake efficiency.

12. The construction of claim 11, wherein said boundary layer diverter (13) has a member with a curved leading edge (13a) merging into said diverter width, and a cover (13') projecting forward of said curved leaving edge, said cover (13') also having a width corresponding to said given width (W) of said flush air inlet means (15), said diverter member spacing said cover (13') from the respective aircraft body surface (10) for forming boundary layer diverter flow channels (13b and 13c) leading away from said flush air inlet means.

13. The construction of claim 11, wherein said aircraft body surface (10') has an opening (21) just upstream of said hinged end (12) of said flap (14) said boundary layer diverter (13") forming a cover which is slightly spaced from said aircraft body surface above said opening (21) to form an air intake scoop which feeds tho boundary layer into the aircraft body away from said flush air inlet means.

* * * * *